United States Patent
Sagfors

(10) Patent No.: US 8,107,369 B2
(45) Date of Patent: Jan. 31, 2012

(54) CONGESTION AND DELAY HANDLING IN A PACKET DATA NETWORK

(75) Inventor: Mats Sagfors, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/588,527

(22) Filed: Oct. 19, 2009

(65) Prior Publication Data

US 2010/0039938 A1 Feb. 18, 2010

Related U.S. Application Data

(62) Division of application No. 10/478,999, filed as application No. PCT/EP02/05873 on May 29, 2002, now Pat. No. 7,664,017.

(30) Foreign Application Priority Data

May 31, 2001 (GB) .................................. 0113214.1

(51) Int. Cl.
*G01R 31/08* (2006.01)
(52) U.S. Cl. ........... 370/230; 370/235; 370/412; 710/52
(58) Field of Classification Search ........................ None
See application file for complete search history.

(56) References Cited

U.S. PATENT DOCUMENTS

| | | | |
|---|---|---|---|
| 5,400,329 A * | 3/1995 | Tokura et al. ................. | 370/232 |
| 5,546,389 A | 8/1996 | Wippenbeck et al. | |
| 5,656,389 A | 8/1997 | Tetzlaff et al. | |
| 6,034,945 A | 3/2000 | Hugnes et al. | |
| 6,134,239 A | 10/2000 | Heinanen et al. | |
| 6,208,620 B1 * | 3/2001 | Sen et al. ...................... | 370/231 |
| 6,680,906 B1 | 1/2004 | Nguyen | |
| 6,690,645 B1 | 2/2004 | Aweya et al. | |
| 6,757,255 B1 * | 6/2004 | Aoki et al. ..................... | 370/252 |

(Continued)

FOREIGN PATENT DOCUMENTS

EP 0 872 988 A 10/1998

(Continued)

OTHER PUBLICATIONS

Firoiu et al; "A Study of Active Queue Management for Congestion Control"; INFOCOM 2000. Nineteenth Annual Joint Conference of the IEEE Computer and Communications Societies. Preoceedings. IEEE Tel Aviv, Israel, Mar. 26-30, 2000, Piscataway, NJ, USA, IEEE, pp. 1435-1444, XP010376080.

(Continued)

*Primary Examiner* — Bob Phunkulh
(74) *Attorney, Agent, or Firm* — Nixon & Vanderhye P.C.

(57) ABSTRACT

A method of managing a data packet queue in a buffer associated with the radio layers of a wireless network, the buffer storing packets prior to their transmission over the radio interface. The method comprises defining minimum and maximum threshold levels for the packet queue, and for a data packet received by the buffer 1) performing a congestion avoidance procedure if the buffer queue exceeds said maximum threshold level, or 2) not performing said procedure if the buffer queue is less than said minimum threshold level, or 3) if the buffer queue lies between said maximum and minimum thresholds, performing said congestion avoidance procedure for said packet, and not performing the procedure for at least one or more subsequent packets.

22 Claims, 6 Drawing Sheets

U.S. PATENT DOCUMENTS

| | | | |
|---|---|---|---|
| 6,766,309 B1 * | 7/2004 | Cheng et al. | 706/3 |
| 6,839,321 B1 * | 1/2005 | Chiruvolu | 370/230.1 |
| 6,865,185 B1 | 3/2005 | Patel et al. | |
| 6,917,585 B1 * | 7/2005 | Firoiu et al. | 370/229 |
| 6,973,622 B1 * | 12/2005 | Rappaport et al. | 715/735 |
| 7,092,355 B1 * | 8/2006 | Duong-Van | 370/230 |
| 7,145,868 B2 | 12/2006 | Giroux et al. | |
| 7,149,664 B1 * | 12/2006 | Firoiu et al. | 703/2 |
| 7,248,564 B1 * | 7/2007 | Grosdidier et al. | 370/235 |
| 7,369,498 B1 * | 5/2008 | Ma et al. | 370/235 |
| 7,664,017 B2 | 2/2010 | Sagfors | |
| 2003/0018794 A1 * | 1/2003 | Zhang et al. | 709/231 |

FOREIGN PATENT DOCUMENTS

| | | |
|---|---|---|
| EP | 1 028 600 A2 | 8/2000 |
| EP | 1 079 660 A | 2/2001 |
| EP | 1 096 737 A | 5/2001 |
| EP | 1 139 615 A | 10/2001 |
| WO | WO 00/57599 | 9/2000 |
| WO | WO 00/60817 | 10/2000 |

OTHER PUBLICATIONS

Goyal et al; "Effect of Number of Drop Precedences in Assured Forwarding"; GLOBECOM 1999, Global Telecommunications Conference, Proceedings, Dec. 5-9, 1999, pp. 188-192, XP010373297.

Floyd et al; "Random Early Detection Gateways for Congestion Avoidance"; IEEE/ACM Transactions on Networking, IEEE Inc. New York, US, vol. 1, No. 4, Aug. 1, 1993, pp. 397-413, XP000415363.

Branden et al., "Random Early Detection," Recommendations on Queue Management and Congestion Avoidance in the Internet, IETF RFC2309, Apr. 1998.

Floyd, http://www.acir.org/floyd/REDparameter.txt, Jul. 17, 2008.

Wu-chang Feng et al., Techniques for Eliminating Packet Loss in Congested TCP-IP Networks, Nov. 1997.

Wu-chang Feng et al., A Self Configuring RED Gateway, Infocom '99, Mar. 1999.

U.S. Appl. No. 10/478,999, filed Jan. 23, 2001; Inventor: Sagfors.

Office Action mailed Feb. 20, 2008 in co-pending U.S. Appl. No. 10/478,999 (now USP 7,665,017).

Office Action mailed Oct. 6, 2008 in co-pending U.S. Appl. No. 10/478,999 (now USP 7,665,017).

Office Action mailed May 13, 2009 in co-pending U.S. Appl. No. 10/478,999 (now USP 7,665,017).

* cited by examiner

CONGESTION AND DELAY HANDLING IN A PACKET DATA NETWORK

This application is a divisional of U.S. application Ser. No. 10/478,999, filed on Jan. 23, 2004, now U.S. Pat. No. 7,664,017, which is the US national phase of international application PCT/EP02/05873, filed in English on 29 May 2002, which designated the US. PCT/EP02/05873 claims priority to GB Application No. 0113214.1, filed 31 May 2001. The entire contents of these applications are incorporated herein by reference.

TECHNICAL FIELD

The technology relates to the handling of congestion and delay in a packet data network, and more particularly, to the early detection of congestion and delay and the implementation of mechanisms for obviating the consequences of congestion and delay.

BACKGROUND

In data packet based communication systems, i.e. in which information to be transmitted is divided into a plurality of packets and the individual packets are sent over a communication network, it is known to provide queue buffers at various points in the network. A buffer may be a sending or input buffer (i.e. a buffer for data packets that are to be sent over a link) or a receiving or output buffer (i.e. a buffer for data packets that have already been sent over a link).

Packets for transporting data may also be called by any of a variety of names, such as protocol data packets, frames, segments, cells, etc., depending on the specific context, the specific protocol used, and certain other conventions. In the context of the present document, all such packets of data shall generically be referred to as data packets. The procedures for placing data packets into a queue, advancing them in the queue, and removing data packets from the queue are referred to as "queue management".

A phenomenon that is known in data packet transmission networks is that of congestion. Congestion implies a state in which it is not possible to readily handle the number of data packets that are required to be transported over that connection or link. As a consequence of congestion at a given link, the number of data packets in a queue buffer associated with said link will increase. In response to a congestion condition, it is known to implement a data packet dropping mechanism referred to as "drop-on-full". According to this mechanism, upon receipt of a new data packet at the queue buffer, a queue length related parameter, such as the actual queue length or the average queue length, is compared to a predetermined threshold. If the predetermined threshold is exceeded, then a data packet is dropped. The threshold indicates the "full" state of the queue.

The data packet which is dropped can be the newly arrived packet, in which case the mechanism is called "tail-drop". Besides the technique of tail-drop, it is also known to perform a so-called "random-drop", where a data packet already in the queue is selected according to a random function, or a so-called "front-drop", where the first data packet in the queue is dropped. Such drop-on-full mechanisms not only serve to reduce the load on the congested link, but also serve as an implicit congestion notification to the source and/or destination of the data packet.

The so-called "Transmission Control Protocol" (TCP) is a commonly used protocol for controlling the transmission of data packets (or "packets") over an IP network. When a TCP connection between peer hosts is initiated, TCP starts transmitting data packets at a relatively low rate. The transmission rate is slowly increased in order to avoid causing an overflow at routers of the IP network (which would result in the loss of data packets and the need to resend these lost packets). The rate at which data packets can be transmitted is defined by two variables, cwnd and ssthresh. TCP uses acknowledgement messages to control the transmission rate, and is constantly probing the link for more transmission capacity.

The variable cwnd defines the number of unacknowledged data packets which the TCP sender may have in "flight" at any given time. At the beginning of a communication, cwnd is set at a low value (e.g. one segment) and the system is in a "slow start" mode. Following receipt of the first acknowledgement from the receiver, cwnd is increased in size by one packet (to two packets). Two further packets are then sent. When an acknowledgement is received by the sender for each further packet, cwnd is increased by one packet. Once both packets have been acknowledged, the size of cwnd is four packets. This process is repeated resulting in an exponential opening of the congestion window. The variable ssthresh is initially set to some fixed level (e.g. 65535 bytes), and the slow start mode continues until cwnd>ssthresh. Thereafter, a "congestion avoidance" mode is entered during which cwnd is increased by just 1/cwnd each time a successful transmission acknowledgement is received. The variable cwnd has an upper limit defined either by the sender or by an advertisement message sent from the receiver.

If congestion occurs as indicated by a timeout (of a controlling timer at the sender), ssthresh is set to one half of the previous value of cwnd, and cwnd is set to 1. Thus, the slow start mode is re-entered and continued until such time as the transmission rate (defined by cwnd) reaches half the rate which last caused congestion to occur. Thereafter, the congestion avoidance mode is entered. If congestion is indicated by receipt of a third duplicate acknowledgements by the sender (indicating that a given data packet has not been received by the receiver despite the receipt of three subsequent segments), ssthresh is set to one half of the previous value of cwnd whilst shrinks to ssthresh. Receipt of three duplicate acknowledgements causes the TCP sender to retransmit the missing data packet using the "fast retransmit" mechanism. After retransmitting the missing data packet, fast recovery takes over. The value of cwnd is set to ssthresh+3, and is increased by 1 packet for each additional duplicate acknowledgement received. An acknowledgement which acknowledges the retransmitted data packet sets cwnd to ssthresh, putting the sender back into congestion avoidance mode.

In any IP packet transmission path, bottlenecks will occur which limit the transmission rate of the available transmission route (or link). In conventional networks, bottlenecks may occur for example at IP routers. Routers handle bottlenecks by using buffers to queue incoming data. If the tail dropping mechanism described above is used to deal with congestion, there is a high probability that two or more packets from the same connection will be dropped. The loss of two or more packets from the same sending window of a TCP connection may cause the TCP sender to enter the slow start mode. This timer-triggered loss recovery may lead to under-utilisation of the link, in particular when the link incorporates significant delays. This in turn results in a waste of link resources and perceived poor link performance on the part of the user.

The tail dropping mechanism may also cause problems due to "global synchronisation". This phenomenon arises when several TCP connections simultaneously reduce their load.

The queue serving the connections may be drained resulting in large fluctuations in the buffer level.

In order to avoid the adverse effects of tail dropping, methods to detect congestion before the absolute limit of the queue is reached have been developed. In general these Early Congestion Detection methods make use of one or more queue threshold levels to determine whether or not a packet arriving at a queue should be accepted or dropped. In the so-called "Random Early Detection" method, RED, [IETF RFC2309], a minimum threshold level $T_{min}$ and a maximum threshold level $T_{max}$ are defined. If the queue size remains below the minimum threshold level, all packets arriving at the queue are accepted and placed at the back of the queue. If the queue size exceeds the maximum threshold level, all packets arriving at the queue are dropped. If the queue size is between the maximum and minimum thresholds, packets are dropped with a certain probability. However, this tends to result in only a fraction of the large set of TCP connections (that share the congested router) reducing their load simultaneously. For a queue fill level greater than the maximum threshold, RED works according to the conventional tail drop scheme. The key to the RED algorithm lies in the early congestion notifications that are transmitted to randomly chosen TCP users by dropping a few packets probabilistically when the queue level exceeds the minimum threshold. Since the congestion feedback is transmitted to a limited number of link users, global synchronisation can be avoided.

In order to allow for a certain level of short-term fluctuations in the queue caused by packet bursts (a property inherent to IP transmissions), the RED algorithm does not operate on the instantaneous queue level, but rather on a moving average measure of the queue level $q_{avg}(.)$. When using the RED algorithm, there are four parameters that have to be set by the operator; a queue filter constant $w_q$, the two queue thresholds $T_{min}$ and $T_{max}$, and the parameter $p_{max}$ which defines the maximum probability for a packet discard when $T_{min} < q_{avg}(.) < T_{max}$.

RED is reported to work well with high capacity routers. A large number of TCP connections are required to overload such capacity. RED relies heavily on this fact: at congestion there are a large number of connections sharing the queue. It thus makes sense to "signal" congestion to only a small fraction of users at the same time in order to avoid global synchronisation.

In the paper "Random Early Detection Gateways for Congestion Avoidance" by Sally Floyd and Van Jacobson, IEEE/ACM Transactions on networking, August 1993, an extensive discussion of the RED algorithm is given, where the minimum threshold $min_{th}$, maximum threshold $max_{th}$, and the maximum probability $max_p$ are all set as fixed parameters. Regarding the choice of $min_{th}$ and $max_{th}$, it is mentioned that the optimum values for these thresholds depend on the desired average queue size, and the optimal value for $max_{th}$ depends in part on the maximum average delay over the link. Furthermore, it is stated that $max_{th}$ should at least be twice as large as $min_{th}$.

In an internet document discussing the setting of RED parameters, published by Sally Floyd at http://www.acir.org/floyd/REDparameter.txt, it is mentioned that the optimum value for fixing $min_{th}$ will depend partly on the link speed, the propagation delay and the maximum buffer size.

In the article "Techniques for eliminating packet loss in congested TCP-IP networks" by Wu-chang Feng et al., November 1997, a so-called adaptive RED is proposed, in which the probability parameter $max_p$ is adapted to the traffic load. Although the detailed algorithm described in this document uses fixed thresholds, it is indicated that the threshold values could also be made dependent on the input traffic. A similar proposal is made in the article "A self configuring RED gateway" by Wu-Chang Feng et al., Infocom '99, March 1999.

Another proposal for improving RED is made in WO 00/60817, in which a differentiation is introduced between traffic originating from rate adaptive applications that respond to packet loss. This document suggests introducing at least two drop precedent levels, referred to as "in profile" and "out profile". Each drop precedent level has its own minimum threshold $min_{th}$ and/or maximum threshold $max_{th}$.

From WO 00/57599 a queue management mechanism is known in which drop functions are selected according to ingress flow rate measurements and flow profiles.

From U.S. Pat. No. 6,134,239 a method of rejecting ATM cells at an overloaded load buffer is known. The concept of RED is mentioned. According to this document, a first threshold related to the overloaded buffer queue, and a second threshold associated with a specific connection are monitored, and incoming packets are dropped for the specific connection if both thresholds are exceeded.

U.S. Pat. No. 5,546,389 describes a method for controlling access to a buffer and is specifically concerned with ATM buffers. The use of one or more thresholds and the dynamic control of such thresholds is mentioned, where the dynamics are determined on the basis of incoming and outgoing traffic.

EP-1 028 600 describes a buffer management scheme with dynamic queue length thresholds for ATM switches. A common threshold is dynamically updated every time a new cell arrives, where the new value is determined based on traffic condition.

Another improvement proposal for RED is described in EP-0 872 988, which has the object of providing isolation when connections using different TCP versions share a bottleneck link. The solution proposed in this document is the use of bandwidth reservation guarantees for each connection. If one connection is being under-utilised, then another connection may use a part of the under-utilised connection's bandwidth. When the connection needs to reclaim its buffer space a predetermined package dropping mechanism is operated, such as a longest queue first (LQF) mechanism.

It will be appreciated that mechanisms such as RED may be employed to trigger the "marking" of data packets when a buffer queue starts to be full. Thus, rather than dropping a packet, the mechanism may add a tag to a packet forwarded to a receiver to notify the receiver that action should be taken to avoid congestion. The receiver may in turn notify the sender. Alternatively, a marked data packet or other notification may be returned directly to the sender.

Whilst much of the state of the art in this area is concerned with IP network routers and the like, the problems of congestion and buffer queue management also arise in mobile communication systems such as cellular telephone networks.

It will be appreciated that queue management of buffers is required when handling packet data traffic which is time critical, such as streaming media content. It may not be possible to tolerate excessive delays in the delivery of such traffic (streaming data may be sent over a UDP connection rather than a TCP connection). Some of the principles and solutions discussed above and below may be applicable to this situation.

SUMMARY

Buffering in mobile communication systems, such as occurs in a UMTS network at the RLC entity of an RNC, must be able to deal satisfactorily with links providing low bandwidth and high latencies. Low bandwidth implies that one or at most a few TCP connections may congest the link. High latency means that TCP will respond slowly when data packets are discarded. The probabilistic view adopted by the RED mechanism is not easily applied to this type of buffering problem. RED applies a low-pass filter on the measured queue level to track long-term trends in the queue size by filtering out high frequency variations due to bursts of data packets. This is not a problem for high capacity routers where large fluctuations relative to the buffer size are not expected. However, for low capacity links, the queue level may build up very quickly relative to the buffer size. For such links (where congestion may develop rapidly) the RED algorithm has two properties that may delay the notification of congestion to the TCP sender:

1) The use of a low pass filter in measuring queue size causes a delay in providing congestion feedback to the TCP sender(s);
2) The probabilistic way of discarding packets, which means that several packets may be accepted into the queue after congestion is detected but before the congestion is notified to the sender.

It has been recognised by the inventors that congestion should be notified to the TCP/UDP sender(s) as soon as congestion is detected. The congestion notification procedure may be implicit, such as dropping a packet, or explicit by marking a congestion flag in the data packet.

According to a first aspect, there is provided a method of managing a data packet queue in a buffer associated with the radio layers of a wireless network, the buffer storing packets prior to their transmission over the radio interface, the method comprising:
 defining minimum and maximum threshold levels for the packet queue; and
 for a data packet received by the buffer,
 1) performing a congestion avoidance procedure if the buffer queue exceeds said maximum threshold level; or
 2) not performing said procedure if the buffer queue is less than said minimum threshold level; or
 3) if the buffer queue lies between said maximum and minimum thresholds, performing said congestion avoidance procedure for said packet, and not performing the procedure for at least one or more subsequent packets.

Preferably, steps 1) and 2) are carried out upon receipt of the packet at the buffer. Alternatively, step 1) may carried out upon receipt of the packet at the buffer, and steps 2) and 3) are carried out when the packet reaches the front of the buffer queue.

In certain example embodiments, in step 3) the number of subsequent packets for which said procedure is not performed is a predefined number of packets.

Preferably, the method comprises predefining a fixed data volume and, in step 3), not performing said procedure on subsequent packets until at least that predefined volume of data has been received.

According to a second aspect, there is provided apparatus for use in a wireless network and comprising:
 a buffer for storing data packets for transmission over radio layers of the wireless network;
 an input for receiving data packets;
 a memory storing minimum and maximum threshold levels for the packet queue within the buffer; and
 a controller arranged for each data packet received by the buffer to,
 1) perform a congestion avoidance procedure if the buffer queue exceeds said maximum threshold level; or
 2) not perform said procedure if the buffer queue is less than said minimum threshold level; or
 3) if the buffer queue lies between said maximum and minimum thresholds, performing said congestion avoidance procedure for said packet, not performing the procedure for one or more subsequent packets, and for packets received thereafter performing steps 1) to 3) as normal.

According to a third aspect there is provided a method of managing a data packet queue at a radio link layer forming part of a packet transmission link, the method comprising:
 measuring or estimating the round trip transmission time over said link, excluding the delay introduced by said queue;
 setting a threshold value based upon the measured or estimated round trip transmission time;
 for packets at the head of the queue, comparing the time spent in the queue with said threshold value; and
 in the event that the time spent in the queue exceeds said threshold value, implementing a congestion or delay avoidance procedure.

Said radio link may be a WCDMA, WCDMA2000, or a GPRS radio link. The radio link may of course make use of some other protocol.

Preferably, said link comprises the Internet.
Preferably, said data packets are TCP or UDP data packets.
Preferably, said congestion or delay avoidance procedure comprises dropping the packet at the head of the queue or another packet in the queue.

Preferably, said congestion or delay avoidance procedure comprises dropping one or more subsequent packets from the queue regardless of the time spent by these packets in the queue.

Preferably, the method comprises defining a minimum queue threshold, $T_{min}$, in terms of data volume or number of packets, and for one or more subsequent packets, accepting and sending the packet regardless of the queue size and packet delay, and for the following packet determining whether the queue size exceeds the minimum threshold and the packet delay in the queue exceeds said threshold value and if so repeating the congestion avoidance procedure, otherwise terminating the congestion avoidance procedure. Preferably, n subsequent packets are accepted regardless of the queue size and packet delay, where n is an integer.

Preferably, the method comprises defining a maximum queue threshold, $T_{max}$, in terms of data volume or number of packets, and for each packet arriving at the queue, comparing the queue size with said maximum threshold and if the queue size exceeds said maximum threshold, dropping the arriving packet or another packet from the queue.

According to a fourth aspect, there is provided apparatus for managing a data packet queue forming part of a packet transmission link, the apparatus comprising:
 means for storing and/or measuring or estimating the round trip transmission time over said link, excluding the delay introduced by said queue;
 means for defining a threshold value based on said stored, measured or estimated round trip transmission time;
 processing means arranged, for packets at the head of the queue, to compare the time spent in the queue with said threshold value and, in the event that the time spent in the queue exceeds said threshold value, to implement a congestion or delay avoidance procedure.

According to a fifth aspect there is provided a method of controlling the entry of data packets into a buffer present in a packet transmission link, the method comprising:

defining a first fixed threshold level and a second variable threshold level for the packet queue size within the buffer; and for each data packet arriving at the buffer, performing a congestion avoidance procedure if the current buffer queue size exceeds said first or second threshold level, and adjusting said second variable threshold level depending upon (a) whether or not a packet is dropped and (b) upon the relative values of the first and second thresholds and the queue size.

Preferably, the method comprises initialising the second variable threshold level to a predetermined minimum threshold level which is less than said first fixed threshold level.

Preferably, the second variable threshold level is adjusted by incrementing or decrementing the level by a fixed amount.

Preferably, the amount by which the variable threshold is incremented is the same as the amount by which it is decremented.

Preferably, the amount by which the variable threshold is incremented is greater than the amount by which it is decremented.

In certain example embodiments, when the variable threshold is incremented it is incremented by a fixed amount and, when the variable threshold is decremented, it is decremented to within some predetermined value in excess of the queue size so as to track the queue size.

Preferably, the second variable threshold level is incremented following receipt of a packet if said congestion avoidance procedure is performed and the second variable threshold level does not exceed the first threshold level.

Preferably, if said congestion avoidance procedure is performed and the second variable threshold level does exceed the first threshold level, the second variable threshold level is not changed.

Preferably, the method comprises decrementing the second variable threshold level following receipt of a packet if said congestion avoidance procedure is not performed, the queue size is less than the second variable threshold level by some predefined amount, and the second variable threshold level is greater than said minimum threshold level.

Preferably, if said congestion avoidance procedure is not performed and the queue size exceeds the second variable threshold less said predefined amount, or the second variable threshold level is less than said minimum threshold level, the second variable threshold level is not changed.

Preferably, said congestion avoidance procedure comprises dropping the newly arrived packet or a packet already held in the buffer.

In certain example embodiments, said congestion avoidance procedure comprises including in the packet a congestion marker.

Preferably, the IP packets belong to a TCP/IP connection, with the packets arriving at the buffer being transmitted there by a TCP sender.

Preferably, the buffer is be associated with a wireless communication network

According to a sixth aspect there is provided apparatus for buffering data packets in a packet transmission link, the apparatus comprising:

a buffer for containing a queue of data packets;
an input for receiving data packets;
a memory storing a first fixed threshold level and a second variable threshold level for the packet queue within the buffer; and
a controller arranged, for each data packet arriving at the buffer, to perform a congestion avoidance procedure if the current buffer queue exceeds said first or second threshold level, and to adjust said second variable threshold level depending upon (a) whether or not a packet is dropped, and (b) the relative values of the first and second thresholds and the queue size.

DETAILED DESCRIPTION OF EXAMPLE EMBODIMENTS

Figure 1:
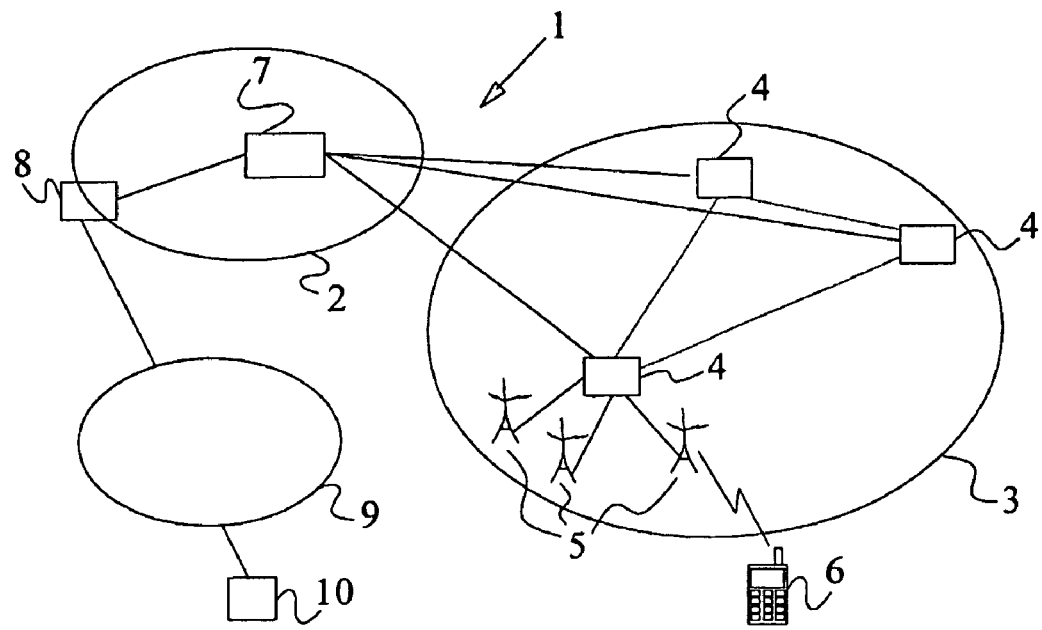
FIG. 1 illustrates schematically a UMTS network comprising a core network and a UTRAN.

FIG. 1 illustrates schematically a UMTS network 1 which comprises a core network 2 and a UMTS Terrestrial Radio Access Network (UTRAN) 3. The UTRAN 3 comprises a number of Radio Network Controllers (RNCs) 4, each of which is coupled to a set of neighbouring Base Transceiver Stations (BTSs) 5. BTSs are sometimes referred to as Node Bs. Each Node B 5 is responsible for a given geographical cell and the controlling RNC 4 is responsible for routing user and signalling data between that Node B 5 and the core network 2. All of the RNCs are coupled to one another. A general outline of the UTRAN 3 is given in Technical Specification TS 25.401 V3.2.0 of the 3rd Generation Partnership Project. FIG. 1 also illustrates a mobile terminal or User Equipment (UE) 6, a Serving GPRS Support Node (SGSN) 7 and a GPRS Gateway Support Node (GGSN) 8. The SGSN 7 and the GGSN 8 provide packet switched data services to the UE 6 via the UTRAN (with the GGSN being coupled to the Internet 9).

Figure 2:
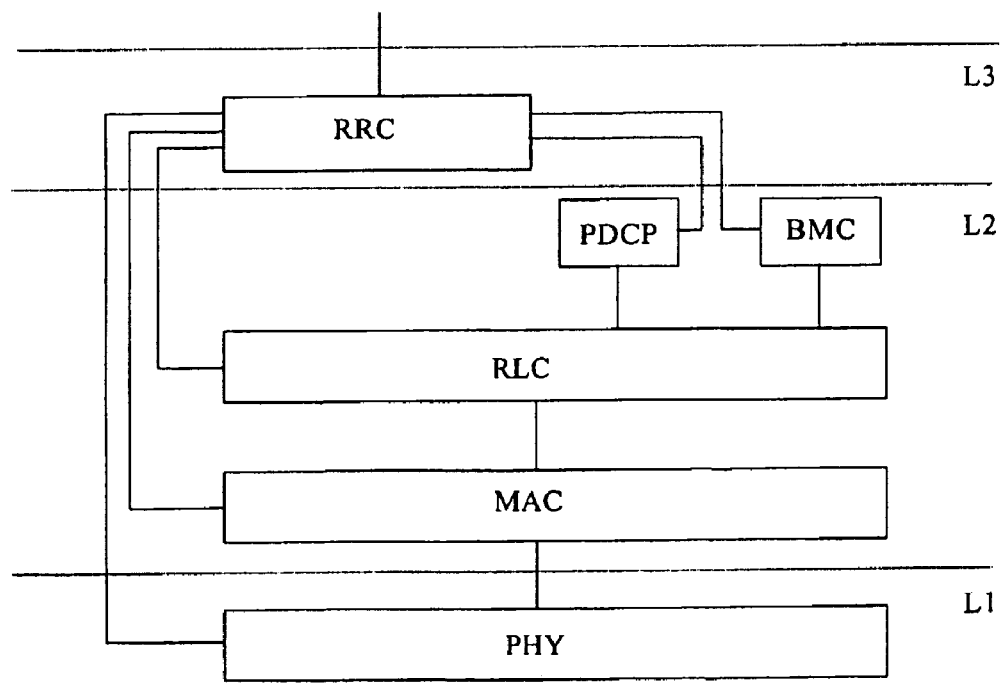
FIG. 2 illustrates certain radio protocol layers existing at a RNC of the UTRAN of FIG. 1.

User data received at an RNC from the UTRAN core network is stored at a Radio Link Control (RLC) entity in one or more RLC buffers. FIG. 2 illustrates certain radio protocol layers implemented at the RNC (and the UEs). User data generated at a UE is stored in RLC buffers of a peer RLC entity at the UE. User data (extracted from the RLC buffers) and signalling data is carried between an RNC and a UE using Radio Access Bearers (RABs). Typically, a UE is allocated one or more Radio Access Bearers (RABs) each of which is capable of carrying a flow of user or signalling data. RABs are mapped onto respective logical channels. At the Media Access Control (MAC) layer, a set of logical channels is mapped in turn onto a transport channel. Several transport channels are in turn mapped at the physical layer onto one or more physical channels for transmission over the air interface between a Node B and a UE.

It is envisaged that UMTS networks will be widely used for carrying data traffic (and using the services of a SGSN and a GGSN). Most current applications which make use of packet switched data services use the Transport Control Protocol (TCP) in conjunction with Internet Protocol (IP) — TCP is used to provide a (connection-oriented) reliable service over the unreliable IP service. It can therefore be expected that the majority of data communications across a UMTS network will use TCP/IP. The same is true for other mobile communication networks (e.g. GSM, GSM with GPRS enhancement, EDGE), although this discussion is restricted to UMTS merely to illustrate the applicability of the technology.

Considering the transfer of data in the downlink direction (i.e. from the UTRAN to the UE), signalling and user data packets (e.g. IP packets) destined for the UE are passed, via a PDCP entity, to the Radio Link Control (RLC) entity. The RLC is responsible for the segmentation of packets (as well as for certain error correction and ciphering functions), and generates RLC Protocol Data Units (PDUs) which are passed to the MAC layer and received as MAC Service Data Units (SDUs). The MAC layer schedules the packets for transmission.

Where a UE has been allocated a dedicated channel (DCH) or downlink shared channel (DSCH), the MAC-d PDUs are passed to the Node B for transmission over the air interface. However, where the UE has been allocated a common channel, the MAC-d PDUs are passed to a MAC-c entity and are received thereby as MAC-c SDUs. The MAC-c entity schedules MAC-c PDUs for transmission on the common channel.

It is assumed now, by way of example, that the UE 6 has requested the downloading of IP data from a correspondent node (CN) 10 which is coupled to the Internet 9. The request is sent via the UMTS network 1 and the Internet 9. The request may be initiated for example by the user of the UE 6 entering a URL into a web browser application at the UE 6. Upon receiving the request, the CN 10 identifies the necessary data, and the TCP entity at the CN 10 begins transmitting IP data packets to the UE 6 using the slow start mode described above. Assuming that there is no congestion in the transmission link, the sending rate will increase until the congestion avoidance mode is entered (the rate may increase further thereafter).

IP data packets are routed through the Internet 9, the core network 2, and the UTRAN 3 to the RNC 4 serving the UE 6. IP packets arriving at the RLC layer are placed in an allocated RLC buffer, awaiting transmission to the UE 6 over the radio interface using a common channel or, more preferably, a dedicated channel. It is noted that several TCP/IP connections may be simultaneously active over one allocated logical channel for a given UE, in which case all IP packets associated with these connections and travelling in the downlink direction will be placed in the same RLC buffer. Alternatively, different connections may be mapped to different logical channels in which case the UE is associated with several RLC buffers simultaneously. A TCP connection may have some guaranteed quality of service or may rely on so-called "best effort". The following discussion concerns best effort connections.

As explained above, a sudden burst of IP packets from a TCP sender (i.e. at the CN 10) may cause the radio link between the RNC 4 and the UE 6 to become congested. There is then a danger that the RLC buffer will become full resulting in the dropping of packets which would in turn result in the TCP sender remaining in or dropping back into the slow start mode. It is desirable to avoid this happening as it results in perceived poor performance on the part of the user, and an inefficient use of the link bandwidth.

Figure 3:
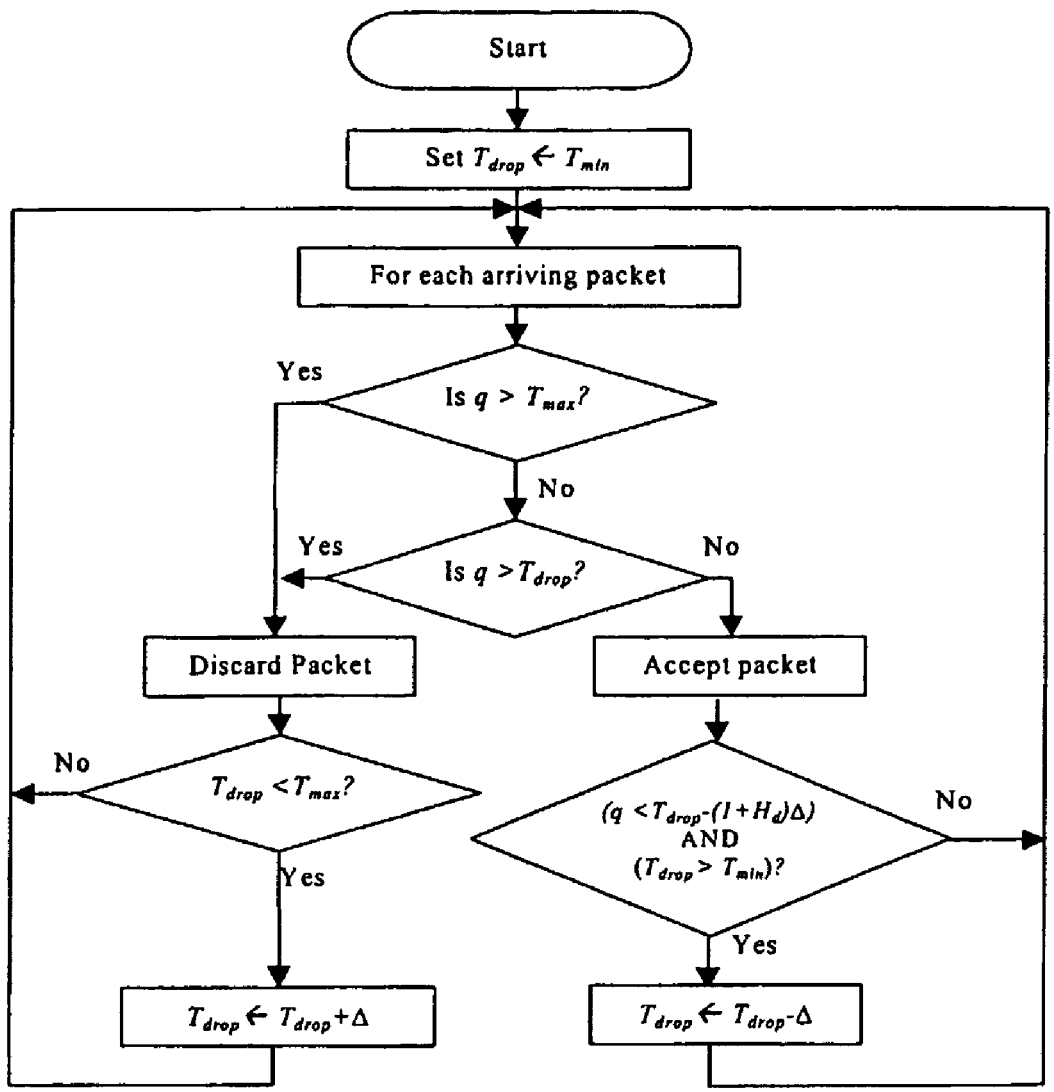
FIG. 3 is a flow diagram illustrating a process for controlling a queue in an RLC buffer of an RNC node of the UTRAN of FIG. 1.

In order to avoid this problem, and in particular to provide early notification to the TCP sender of congestion in the link, the algorithm illustrated in the flow diagram of FIG. 3 is used to control the RLC buffer queue. The algorithm uses three queue threshold levels, a fixed minimum threshold level $T_{min}$, a fixed maximum threshold level $T_{max}$, and a movable or variable threshold level $T_{drop}$. $T_{drop}$ is initially set to $T_{min}$.

As each packet arrives at the RLC layer of the serving RNC 4, the size q of the RLC buffer queue is determined. If the queue size q is greater than $T_{max}$, the queue is large relative to the link capacity and it can be assumed that the link is congested. The received packet is therefore dropped. It is then determined whether $T_{drop}$ is less than $T_{max}$. If so, the value of $T_{drop}$ is incremented by some predetermined hysteresis value Δ. If on the other hand $T_{drop}$ exceeds $T_{max}$, $T_{drop}$ is not incremented. Assuming that subsequent packets are delivered to the UE 6, the TCP sender will receive duplicate acknowledgements notifying it of the missing packet. The fast retransmit mechanism will be used to resend that packet.

If it is determined that the queue size q is less than $T_{max}$, but that the queue size q is greater than $T_{drop}$, the received packet is still discarded and $T_{drop}$ is incremented if $T_{drop}$ is less than $T_{max}$. However, if the queue size q is less than $T_{max}$, and less than $T_{drop}$, it can be assumed that the link is not congested and the received packet is accepted and placed at the back of the queue in the RLC buffer. If the queue size is then determined to be less than $T_{drop}$ by some predetermined amount, $(1+H_d)$ Δ, and $T_{drop}$ is greater than $T_{min}$, it can be assumed that an earlier congestion has been eased. $T_{drop}$ is therefore decremented by the hysteresis value Δ. If either of these conditions is not met, $T_{drop}$ is left unchanged.

The value Δ may be the same for both incrementing and decrementing steps. However, some advantage may be obtained by decrementing $T_{drop}$ by a value which is smaller than that used when incrementing $T_{drop}$. This tends to result in $T_{drop}$ being decremented more frequently, but with a smaller "granularity", than would otherwise be the case.

It will be clear from the preceding discussion that at early detection of congestion, i.e. when the queue level exceeds $T_{drop}$, one packet is discarded. The queue threshold mark $T_{drop}$ is then increased by the hysteresis value Δ. This value of the moving threshold $T_{drop}$ is valid until the queue is either drained by an amount $H_d·Δ$ filled by an amount Δ. In the event that the queue is drained by $H_d·Δ$, the moving threshold is decreased by Δ. The parameter $H_d$ is used to define an asymmetric switch and should be greater than 0.

It will be noted that there are four parameters which must be set; $T_{min}$, $T_{max}$, Δ, and $H_d$. However, if a symmetric threshold switching is used (i.e. $H_d=1$), there are only three settable parameters.

Parameter $T_{min}$: The setting of the early congestion threshold mark $T_{min}$ is a critical issue. This parameter defines the queue capacity that should accumulate both high-frequency variations due to packet bursts and low frequency variations caused by the TCP bandwidth probing mechanism. One possible way of determining $T_{min}$ is as follows:

The link capacity is estimated according to $$LC=(RTT_{wc}+RTT_{link})·DR$$

where $RTT_{wc}$ is the worst-case estimate of the TCP roundtrip time without the contribution from the wireless (bottleneck) link. $RTT_{link}$ is the delay contribution from the congested link and DR denotes the link data rate.

EXAMPLE

A reasonable estimate for $RTT_{wc}$ could be 200-300 ms whereas a wireless link may exhibit some 200-400 ms for RTT$_{link}$. The total TCP RTT, excluding buffering, is then some 0.4-0.7 s. LC is the capacity of the link, excluding buffering capacity prior to the link. To ensure link utilisation, it should be ensured that the TCP window (load) is greater than (or equal to) LC. Excessive load is stored in the queue. Since the TCP window is halved at detection of congestion, it should be ensured that the TCP window may grow to 2LC. A queue capacity of LC guarantees that the TCP load can vary between LC and 2LC, provided TCP timeouts can be prevented. A constant ϵ may added to the congestion threshold mark:

$$T_{min} = LC + \epsilon.$$

The parameter ϵ should take into account the uncertainty in the estimate of LC, as well as the high-frequency variations in the queue level due to packet bursts. The parameter can be set to zero or to a positive value to account for a small number of packets, depending on how conservative the LC estimate is.

The parameter $T_{max}$: Setting of $T_{max}$ is less critical, as a well behaving queue should not reach this fill state in normal operation. Thus, $T_{max}$ should be large—without wasting hardware resources. A minimum requirement is that the queue should be able to accommodate the load increase during slow-start clocked by unacknowledged TCP segments in flight prior to the segment that was discarded from the queue at congestion detection. This reasoning would support a minimum value of $T_{max} = 2 \cdot T_{min}$ for a queue in which the arriving packet is subject to discard. However, a value $T_{max} = 4 \cdot T_{min}$ may be used.

The threshold Δ a should be set to account for occasional bursts of incoming packets, (i.e. some 3-5 kbytes).

It will be appreciated that whilst the queue management mechanism is primarily intended for implementations at the RNC of a cellular telecommunications network, it can also be implemented at the mobile nodes, and in particular to manage the buffers at the mobile nodes used for transmitting IP packets in the uplink direction.

Figure 4:
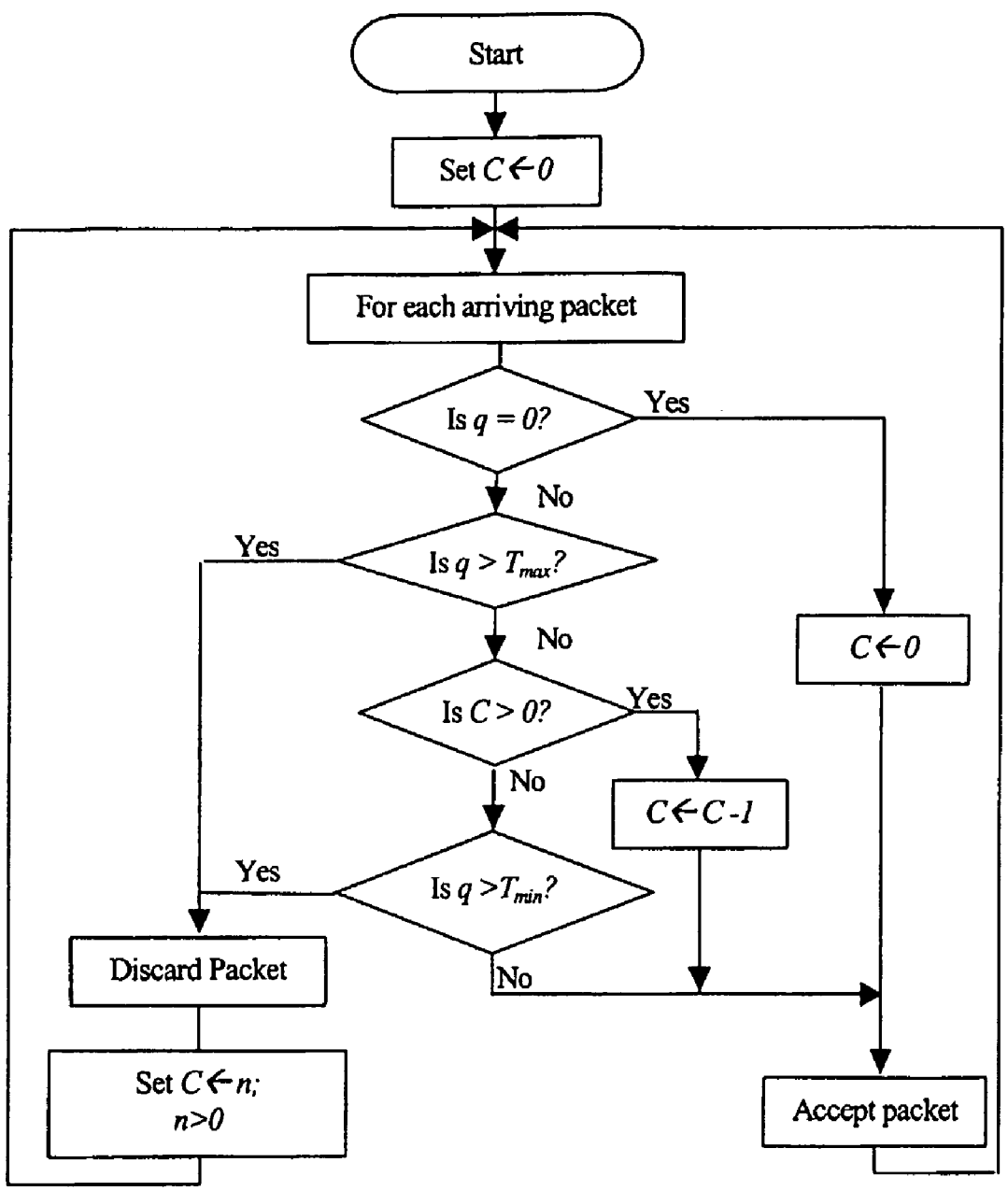
FIG. 4 is a flow diagram illustrating an alternative process for controlling a queue in an RLC buffer of an RNC node of the UTRAN of FIG. 1.

FIG. 4 illustrates an alternative mechanism for controlling the RLC buffer. This mechanism relies on only two fixed thresholds, $T_{max}$ and $T_{min}$. This is similar to the RED mechanism. However, rather than use a probabilistic approach to dropping packets when the queue size lies between $T_{max}$ and $T_{min}$, a counter C is used to allow only one in every (n+1)th packet to be dropped. The parameters $T_{max}$ and $T_{min}$ may be determined as described above (with reference to the mechanism of FIG. 3). The value n should be related to the expected TCP window size to avoid discarding several segments from the same TCP window—preferred values are in the range of 20 to 30 packets. The expected number of TCP connections sharing the link bandwidth may, however, affect the preferred settings. The counter C may be reset to n if the queue becomes empty or drops below some other threshold (e.g. $T_{min}$). As illustrated in FIG. 4, if the queue size lies between $T_{min}$ and $T_{max}$, only every n+1th packet will be discarded. If the queue size exceeds $T_{max}$, a received packet will be automatically discarded, whilst if the queue size falls below $T_{min}$ the packet will be automatically accepted.

FIG. 4 includes a step of resetting the counter C to 0 in the event that the queue is drained empty. This is necessary in order to avoid a residual high C value (resulting from previous congestion which has now eased) from preventing the rapid implementation of the congestion avoidance procedure when subsequent congestion occurs. Of course, some other threshold may be set for resetting C to 0, e.g. a value between 0 and $T_{min}$.

Packets arriving at the buffer may differ in size from one another. A fixed value of n may therefore not be appropriate in determining when to signal congestion to a TCP sender by dropping a packet. A better approach may be to maintain a data counter and to drop packets (if the queue size exceeds $T_{min}$) after some predefined volume of data has been received, e.g. 10 Kbytes.

Figure 5:
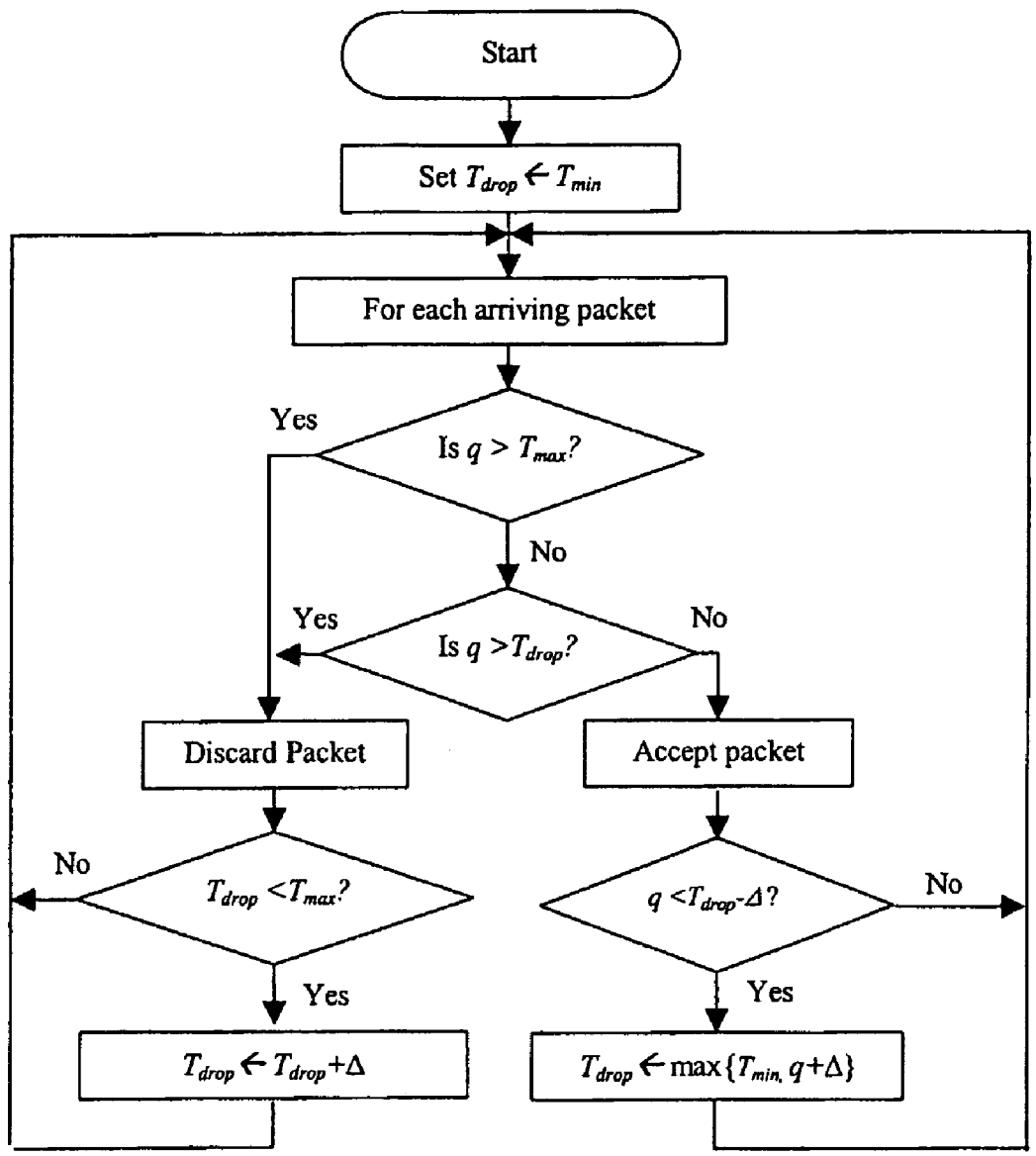
FIG. 5 is a flow diagram illustrating another alternative process for controlling a queue in an RLC buffer of an RNC node of the UTRAN of FIG. 1.

FIG. 5 illustrates yet another mechanism for controlling the RLC buffer. This mechanism differs from that illustrated in FIG. 4 in so far as, when reducing $T_{drop}$, $T_{drop}$ is made to track the queue size, always exceeding the queue size by a fixed amount $\Delta_2$. The value $\Delta_2$ may or may not be the same as the value $\Delta_1$ by which $T_{drop}$ is incremented. The advantage of this approach is that if the queue size falls rapidly, $T_{drop}$ will also fall rapidly ensuring that the new value of $T_{drop}$ is appropriate when further packets are subsequently received.

The mechanisms described above have assumed that when a decision is made to drop a packet, the packet which is dropped is that packet most recently received from the TCP sender. However, it may be advantageous to accept this packet, adding it to the back of the queue, whilst dropping a packet already in the queue, preferably at or close to the front of the queue. Dropping packets in this way will most probably speed up the notification of congestion to the sender—subsequent packets of the same TCP connection may already be in the queue behind the dropped packets resulting in the rapid return of duplicate acknowledgements to the sender. This approach also reduces the chances of the dropped packet being the last packet in a transmission, for which no duplicate acknowledgements can be returned (and to which fast retransmission cannot be applied).

It will be appreciated by the person of skill in the art that various modifications may be made to the above described embodiments without departing from the scope of the claims. In particular, whilst the above embodiments have been concerned with the transfer of data in the downlink direction, the technology applies equally to the transfer of data in the uplink direction, i.e. from the UE to a correspondent node. In this case, the RLC buffer being controlled will be a buffer associated with the radio layers at the UE. It will also be appreciated that the technology is not limited to applications in UMTS networks but also finds applications in other packet networks where data is buffered including, but not limited to, other telecommunications networks.

In a resource limited system like WCDMA, link bandwidth for active users is allocated on demand. Such resource allocation can result for example from Channel (Rate) Switching, where the link rate of a dedicated channel (DCH) is changed from one rate to another, or from the scheduling of traffic of shared resources (shared channels, DSCH). As a result, the data rate (DR) may vary considerably during a session, and the bandwidth available to a user is therefore very much dependent on factors such as link load, cell congestion, radio coverage, cell hand-over etc. In addition, a user may experience varying bandwidth due to link errors.

Figure 6:
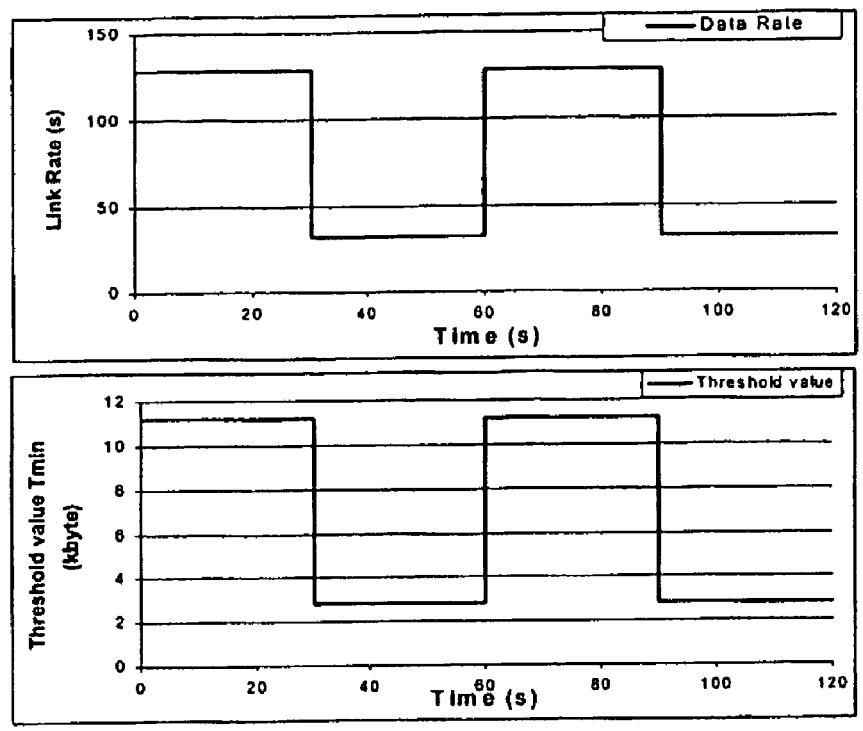
FIG. 6 illustrates the variable link rate of a radio link, and the corresponding changes in a calculated value $T_{min}$.

This complicates the evaluation of an appropriate value of the threshold $T_{min}$, since according to the algorithm given above (LC=(RTT$_{wc}$+RTT$_{link}$)·DR), the threshold should be proportional to the data rate DR. This is illustrated in FIG. 6, where it is assumed that the link rate is switched between 128 kbit/s and 32 kbit/s with intervals of 30 seconds. The value of $T_{min}$ should be changed accordingly, as illustrated in the lower graph in FIG. 6. It is important to note that the total RTT of the link is only slightly dependent on the link bandwidth, since the main contribution to RTT is caused by the link error correction methods and not the transmission delay.

Adapting the threshold(s) to the present link bandwidth can be a non-trivial issue, in particular if the bandwidth of the link is changing often. Whilst for dedicated channels it may be assumed that the queue has access to the configured link bandwidth, this does not account for the true throughput at the link layer, which includes the effects of link errors etc. For a user on a shared channel (DSCH), computing the available bandwidth is further complicated by the fact that the prevailing bandwidth of one user is dependent on the load of the other users sharing the same channel. Thus, some kind of estimator of the prevailing bandwidth will be necessary in order to obtain appropriate values for the buffer size threshold (s). This could rely upon some filtered value of the momentary bandwidth, but designing such a filter is not necessarily a trivial task.

Thus, for links with a stable or only slowly varying bandwidth, the solution described above may be satisfactory. For WCDMA links however, the link-rate variations introduce additional problems that call for efficient adaptation of the buffer level to the present link bandwidth. Improvements/modifications can be made to the above solution for this purpose.

Traditionally, buffer level control has been based on the number of packets in the buffer. For large IP routers, where header processing may be the bottleneck procedure, this is a reasonable approach. For bandwidth-limited links, as in the present problem, the queue size is preferably measured in terms of amount of data [kbytes]. However, this involves buffer level adaptation when the link bandwidth changes as described above. A different approach will now be described which is based upon the observation that the Round Trip Time of a wireless link is caused mainly by error protection methods including both Forward Error Correction (e.g. interleaving depth, coding, transmission interval) and re-transmissions over an acknowledge-mode link (ARQ), and that the RTT of the link is therefore substantially independent of the link bandwidth. Only for low link rates does the effect of the transmission delay increase. Link RTTs (excluding buffering) of the order of 200-500 ms have been observed, independently of link bandwidth.

The proposal here uses a queue threshold ($t_{TIME}$) which is defined in terms of the buffering delay of each packet:

$$t_{TIME} \leftarrow (RTT_{INTERNET} + RTT_{LINK})$$

Where $RTT_{INTERNET}$ is an estimate of the worst-case delay of the wired network and $RTT_{LINK}$ is an estimated or measured value of the link round-trip time.

This threshold is for identifying link congestion, and the threshold is used to trigger an Active Queue Management procedure along the lines of those described above. As the RTT is independent of the transmission delay, there is no need to adapt the threshold even if the link bandwidth is varying. Thus, there is no need to estimate the bandwidth, and the threshold $t_{TIME}$ is solely dependent on an estimate of the RTT.

In FIG. 6, the bandwidth is varying by a factor of four. If the queue threshold is defined in terms of $T_{min}$ [bytes], the $T_{min}$ threshold should be adapted by the same factor. In that case, the buffer algorithm must be re-configured when the channel is switched. If we define the threshold in terms of $t_{TIME}$ [seconds] there is no need to adapt the buffer algorithm, as $t_{TIME}$ is constant and independent of the link bandwidth. In the example in FIG. 6, the $t_{TIME}$ threshold would be 0.7 seconds. As the queue threshold is set in terms of absolute delay, it is easier to define a delay bound for the link and thereby guarantee a certain QoS. The timer-based threshold is particularly well suited for DSCH channels, where the capacity for each user is difficult to evaluate, but the link RTT does not vary to any great extent. The timer-based threshold is implicitly observing bandwidth degradations caused by link errors, whereas the byte or packet threshold does not account for link errors, unless some advanced link error observer (filter) is applied.

It is appreciated that for low-bandwidth links, the transmission delay contribution can be significant. For example, consider the transfer of a 1 kbyte packet. The transmission delay over a 384 kbit/s link is 20 ms, over a 128 kbit/s it is 63 ms, whilst a 32 kbit/s results in a transmission delay of 250 ms. Compared to the RTT of the wireless link, which is of the order of 500 ms (on SDU level), the transmission delay is insignificant for higher bandwidths. However, for lower bandwidths (~32 kbit/s and below), the transmission delay is increasing in significance. For a link capacity of 8 kbit/s, the transmission delay of a 1 kbyte packet is 1 second. It is noted that this transmission delay may be larger than the desired $t_{TIME}$ threshold. For this reason, it is proposed that the timer-based threshold is activated only if there are at least N packets in the queue (or alternatively if the buffer contains some predefined volume of data). Typically, N should be at least 3 packets to accommodate the initial load of one TCP connection. This guarantees a minimum buffer fill level (e.g. 3 packets) for low bandwidth links. It also guarantees that packets are not discarded in case the buffering delay is caused by link errors and not by link overload. This mechanism also reduces the risk of discarding a packet belonging to the last few packets of a TCP connection. Such losses would lead to TCP timeouts and delays in object transfer.

Figure 7:
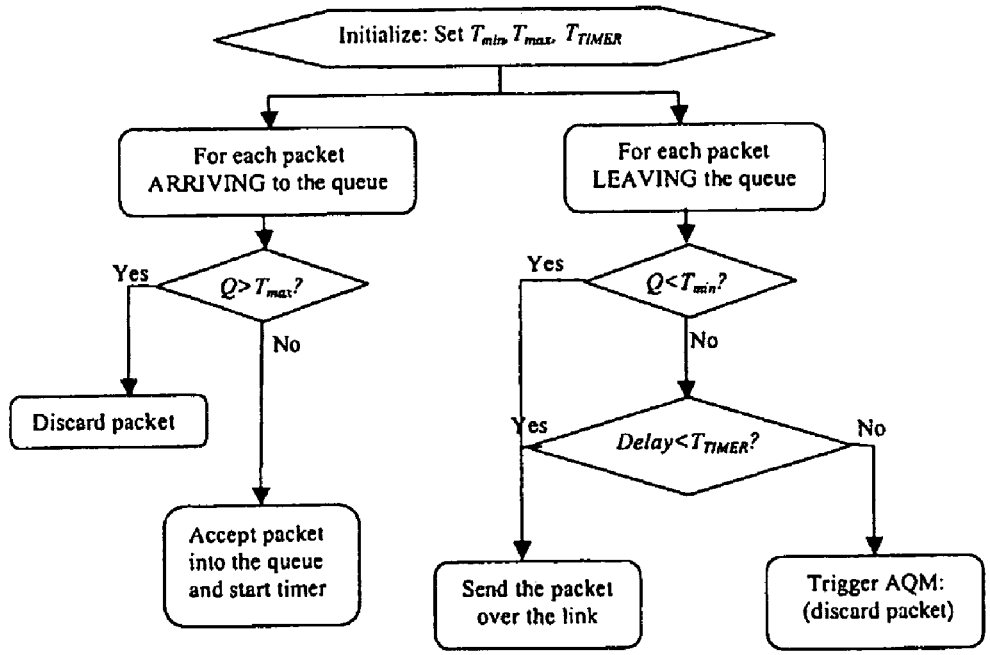
FIG. 7 is a flow diagram illustrating yet another alternative process for controlling a queue in an RLC buffer of an RNC node of the UTRAN of FIG. 1.

FIG. 7 is a flow diagram illustrating the Active Queue Management procedure according to this embodiment. The system is initialised by first defining a maximum threshold $T_{max}$ [in bytes/packets]. This threshold defines the absolute limit of the queue. If the buffer exceeds this limit, newly arriving packets are dropped (i.e. the classical drop-on-full policy is applied). A minimum threshold $T_{min}$ [in bytes/packets] is then defined. This threshold defines the level up to which all packets are accepted, regardless of buffering delay. Preferably, this level should be set to at least 3 packets, to allow for an initial TCP load. The timer threshold $t_{TIME}$ [in seconds] is then defined. This threshold is based on an estimate of the end-to-end RTT, where the wireless link is the dominating latency source. Note that $t_{TIME}$ can be adaptive based on actual measurements from the link.

Two management policies are applied to packets.

For each packet arriving at the queue:
1) If Queue>$T_{max}$: Discard the arriving packet, or another packet from the queue, else: accept the arriving packet and time-stamp the packet (or start a timer).
2) For each packet leaving the queue, performing a normal checking operation:
   If Queue<$T_{min}$: Do not discard the packet (regardless of the buffering delay).
   If the buffering delay of the packet>$t_{TIME}$, then discard the packet and apply a packet discard prevention procedure.

The preferred packet discard prevention procedure comprises repeating step 2) for the (n+1)th packet following the discarded packet—intervening packets are accepted regardless of the respective delays. It will be appreciated that, in the event that a packet is to be discarded, a packet other than the packet at the output end of the buffer may be discarded. For example, a packet at the input end of the buffer may be discarded. In the same way, when for a packet received by the buffer the queue size exceeds $T_{max}$, a packet other than the received packet may be discarded. Rather than using a packet counter to determine when to discard a packet (assuming that the queue size is between $T_{min}$ and $T_{max}$), a data volume counter may be used, i.e. discard a packet once 10 Kbytes of data have been received.

A typical scenario will now be considered, where one TCP connection is loading a WCDMA link. The link is subject to periodic changes in the bandwidth, so that the channel is switched between 128 kbit/s and 32 kbit/s every 30 seconds. In the simulation, $T_{min}$ is set to 4.5 kbyte to allow for at least four 1.5 kbyte packets in the buffer. The parameter $T_{max}$ is set sufficiently large (30 kbyte) to avoid queue saturation. The timer threshold $t_{TIME}$ is set to 0.7 seconds, which assumes that the RTT of the link is 0.5 seconds and the RTT of the wired network is 0.2 seconds. The Packet Discard Prevention Counter is configured with n=10. This means that after one packet has been discarded, the following 10 packets are accepted regardless of whether or not the packet delay exceeds $t_{TIME}$.

Figure 8:
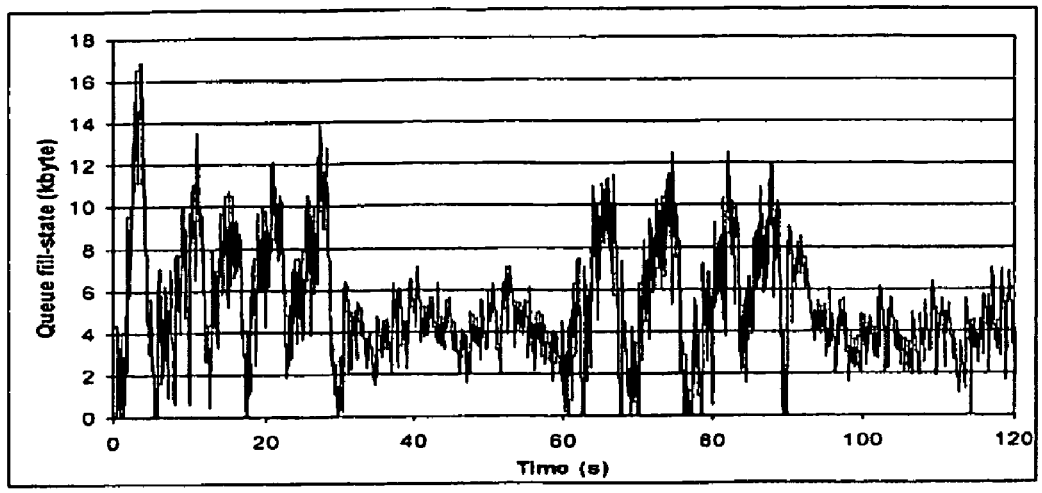
FIG. 8 illustrates a queue fill state in simulated example.
Figure 9:
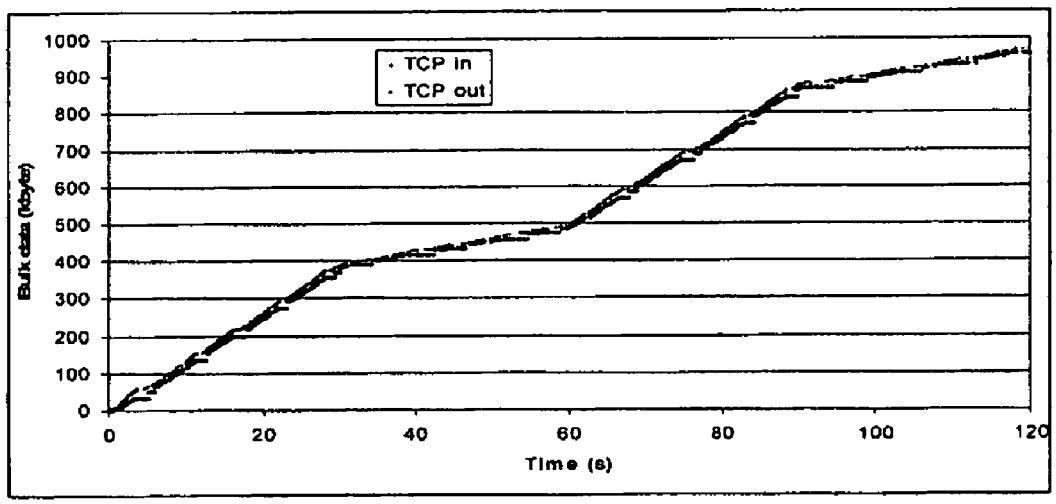
FIG. 9 illustrates the throughput of TCP data in a buffer in the simulated example of FIG. 8.

The queue fill-state is illustrated in FIG. 8. As can be seen, the queue is allowed to reach a much higher fill-state during the periods of higher bandwidth. Observe the regular buffer load variations due to TCP's bandwidth probing mechanism. With reference to FIG. 6, during the 128 kbit/s periods (0-30 sec and 60 to 90 sec), the delay threshold is reached at a queue fill-state of about 10 to 12 kbytes, as predicted by FIG. 6. At 32 kbit/s however, the packet dropping policy of the above algorithm is constrained, i.e. no packets are discarded unless the queue fill-state is greater than 4.5 kbyte.

As with the embodiments described earlier, the embodiment of FIG. 7 may be employed at mobile nodes as well as at the RNC.

The mechanism described in the preceding paragraphs provides an easy way of adapting the buffer size to changing link conditions in an Active Queue Management scheme for TCP traffic. The purpose of this adaptation mechanism is to ensure high link utilization and at the same time avoid excessive buffering. In the context of solving the buffering problem for links with time-varying capacity, the present solution provides a new frame.

The invention claimed is:

1. A method of managing a data packet queue at a radio link layer forming part of a packet transmission link, the method comprising:
   measuring or estimating the round trip transmission time over said link, excluding a delay introduced by said queue;
   setting a threshold value based upon the measured or estimated round trip transmission time;
   for packets at the head of the queue, comparing a time spent in the queue with said threshold value; and
   in the event that the time spent in the queue exceeds said threshold value, implementing a congestion or delay avoidance procedure.

2. A method according to claim 1, wherein said link is a WCDMA, WCDMA2000, or GPRS radio link.

3. A method according to claim 1, wherein said link comprises the Internet.

4. A method according to claim 1, wherein said data packets are TCP or UDP data packets.

5. A method according to claim 1, wherein said congestion or delay avoidance procedure comprises dropping the packet at the head of the queue or another packet in the queue.

6. A method according to claim 5, wherein said congestion or delay avoidance procedure comprises dropping one or more subsequent packets from the queue regardless of the time spent by these packets in the queue.

7. A method according to claim 5 and comprising defining a minimum queue threshold, $T_{min}$, in terms of data volume or number of packets, and for one or more subsequent packets, accepting and sending the packet regardless of the queue size and packet delay, and for the following packet, determining whether the queue size exceeds the minimum threshold and the packet delay in the queue exceeds said threshold value, and if so, repeating the congestion avoidance procedure, otherwise terminating the implemented congestion avoidance procedure.

8. A method according to claim 7, wherein n subsequent packets are accepted regardless of the queue size and packet delay, where n is an integer.

9. A method according to claim 1 and comprising defining a maximum queue threshold, $T_{max}$, in terms of data volume or number of packets, and for each packet arriving at the queue, comparing the queue size with said maximum threshold and if the queue size exceeds said maximum threshold, dropping the arriving packet or another packet from the queue.

10. Apparatus for managing a data packet queue forming part of a packet transmission link, the apparatus comprising:
    means for storing and/or measuring or estimating the round trip transmission time over said link, excluding a delay introduced by said queue;
    means for defining a threshold value based on said stored, measured, or estimated round trip transmission time;
    processing means arranged, for packets at the head of the queue, to compare a time spent in the queue with said threshold value and, in the event that the time spent in the queue exceeds said threshold value, to implement a congestion or delay avoidance procedure.

11. An apparatus according to claim 10, wherein said data packets are TCP or UDP data packets.

12. An apparatus according to claim 10, wherein said congestion or delay avoidance procedure comprises dropping the packet at the head of the queue or another packet in the queue.

13. An apparatus according to claim 10, wherein said congestion or delay avoidance procedure comprises dropping one or more subsequent packets from the queue regardless of the time spent by these packets in the queue.

14. An apparatus according to claim 10, wherein for a minimum queue threshold, $T_{min}$, defined in terms of data volume or number of packets and for one or more subsequent packets, the apparatus further comprises:
    means for accepting and sending the packet regardless of the queue size and packet delay, and
    means for determining, for a following packet, whether the queue size exceeds the minimum threshold and the packet delay in the queue exceeds said threshold value, and if so, repeating the congestion avoidance procedure, and otherwise terminating the implemented congestion avoidance procedure.

15. An apparatus according to claim 14, wherein n subsequent packets are accepted regardless of the queue size and packet delay, where n is an integer.

16. A method according to claim 10, wherein for a maximum queue threshold, $T_{max}$, defined in terms of data volume or number of packets and for each packet arriving at the queue, the apparatus further comprises:
    means for comparing the queue size with said maximum threshold, and if the queue size exceeds said maximum threshold, for dropping the arriving packet or another packet from the queue.

17. A communications node comprising:
    a data packet queue forming part of a packet transmission link, and
    electronic circuitry configured to:

store and/or measure or estimate the round trip transmission time over the packet transmission link excluding a delay introduced by the data packet queue;

define a threshold value based on said stored, measured, or estimated round trip transmission time; and for packets at the head of the queue, compare a time spent in the queue with said threshold value and, in the event that the time spent in the queue exceeds said threshold value, implement a congestion or delay avoidance procedure.

18. A communications node according to claim 17, wherein said congestion or delay avoidance procedure comprises dropping the packet at the head of the queue or another packet in the queue.

19. A communications node according to claim 17, wherein said congestion or delay avoidance procedure comprises dropping one or more subsequent packets from the queue regardless of the time spent by these packets in the queue.

20. A communications node according to claim 17, wherein for a minimum queue threshold, $T_{min}$, defined in terms of data volume or number of packets and for one or more subsequent packets, the electronic circuitry is configured to:

accept and send the packet regardless of the queue size and packet delay, and determine, for a following packet, whether the queue size exceeds the minimum threshold and the packet delay in the queue exceeds said threshold value, and if so, repeat the congestion avoidance procedure, and otherwise terminate the implemented congestion avoidance procedure.

21. A communications node according to claim 20, wherein n subsequent packets are accepted regardless of the queue size and packet delay, where n is an integer.

22. A communications node according to claim 17, wherein for a maximum queue threshold, $T_{max}$, defined in terms of data volume or number of packets and for each packet arriving at the queue, the electronic circuitry is configured to compare the queue size with said maximum threshold, and if the queue size exceeds said maximum threshold, drop the arriving packet or another packet from the queue.

* * * * *

UNITED STATES PATENT AND TRADEMARK OFFICE
CERTIFICATE OF CORRECTION

| | | |
|---|---|---|
| PATENT NO. | : 8,107,369 B2 | Page 1 of 1 |
| APPLICATION NO. | : 12/588527 | |
| DATED | : January 31, 2012 | |
| INVENTOR(S) | : Sagfors | |

It is certified that error appears in the above-identified patent and that said Letters Patent is hereby corrected as shown below:

In Column 16, Line 56, in Claim 16, delete "method" and insert -- apparatus --, therefor.

Signed and Sealed this
Thirty-first Day of July, 2012

David J. Kappos
*Director of the United States Patent and Trademark Office*